United States Patent [19]

O'Neill et al.

[11] Patent Number: 4,839,656

[45] Date of Patent: Jun. 13, 1989

[54] POSITION DETERMINATION AND MESSAGE TRANSFER SYSTEM EMPLOYING SATELLITES AND STORED TERRAIN MAP

[75] Inventors: Gerard K. O'Neill, Princeton, N.J.; Leslie O. Snively, Centreville, Va.

[73] Assignee: Geostar Corporation, Washington, D.C.

[21] Appl. No.: 641,385

[22] Filed: Aug. 16, 1984

[51] Int. Cl.⁴ .............................................. G01S 13/78
[52] U.S. Cl. ..................................... 342/357; 342/33; 342/46
[58] Field of Search ............... 343/352, 353, 357, 356, 343/5 MM, 419, 6.5 R, 15, 6.8 R; 364/449, 451, 456; 342/33, 46

[56] References Cited

U.S. PATENT DOCUMENTS

| | | | |
|---|---|---|---|
| 2,746,034 | 5/1956 | Hasbrook | 343/15 |
| 2,972,742 | 2/1961 | Ross . | |
| 3,047,861 | 7/1962 | Arnold et al. . | |
| 3,209,357 | 9/1965 | Wyatt . | |
| 3,384,891 | 5/1968 | Anderson | 343/353 X |
| 3,430,234 | 2/1969 | Wright . | |
| 3,495,260 | 2/1970 | Laughlin et al. . | |
| 3,497,807 | 2/1970 | Newton . | |
| 3,534,367 | 10/1970 | Laughlin et al. . | |
| 3,544,995 | 12/1970 | Bottenberg et al. . | |
| 3,611,379 | 10/1971 | Deckett | 343/15 |
| 3,624,650 | 11/1971 | Paine . | |
| 3,668,403 | 6/1972 | Meilander . | |
| 3,742,495 | 6/1973 | Diamantides . | |
| 3,742,498 | 6/1973 | Dunn . | |
| 3,750,166 | 7/1973 | Dearth . | |
| 3,766,552 | 10/1973 | Hajduk . | |
| 3,810,179 | 5/1974 | Merrick | 343/6.5 R X |
| 3,836,970 | 6/1973 | Reitzig . | |
| 3,886,553 | 5/1975 | Bates . | |
| 3,888,122 | 6/1975 | Black . | |
| 3,918,056 | 11/1975 | Merrick . | |
| 3,988,734 | 10/1976 | Elwood . | |
| 4,042,923 | 8/1977 | Merrick . | |
| 4,161,730 | 7/1979 | Anderson . | |
| 4,170,776 | 10/1979 | MacDoran | 343/112 |
| 4,179,693 | 12/1979 | Evans et al. . | |
| 4,224,669 | 9/1980 | Brame . | |
| 4,253,098 | 2/1981 | Blythe . | |
| 4,292,634 | 9/1981 | Wu et al. . | |
| 4,359,733 | 11/1982 | O'Neill . | |
| 4,360,876 | 11/1982 | Girault et al. . | |
| 4,386,355 | 5/1983 | Drew et al. . | |
| 4,387,373 | 6/1983 | Longuemare, Jr. . | |
| 4,445,120 | 4/1984 | Rosenthal | 343/462 |
| 4,472,720 | 9/1984 | Reesor | 343/388 |

FOREIGN PATENT DOCUMENTS

| | | |
|---|---|---|
| 1591518 | 4/1970 | Fed. Rep. of Germany . |
| 3016901 | 11/1981 | Fed. Rep. of Germany . |
| 1547539 | 6/1979 | United Kingdom . |

OTHER PUBLICATIONS

R. E. Anderson, "A Navigation System Using Range Measurements from Satellites with Cooperating Ground Stations", Navigation (Journal of the Institute of Navigation), vol. 11, No. 3, pp. 315-334 (Autumn 1964).

(List continued on next page.)

Primary Examiner—Thomas H. Tarcza
Assistant Examiner—Mark Hellner
Attorney, Agent, or Firm—Robbins & Laramie

[57] ABSTRACT

A radio position determination and message transfer system is implemented using a pair of satellites in geostationary orbit for relaying interrogation and reply signals between a ground station and a user-carried transceiver. The user position is calculated based on the arrival times of reply signals received at the ground station via the two satellites, the known transmission time of the interrogation signal from the ground station, and the user's elevation on the surface of the earth. The elevation is derived from a stored terrain map providing local terrain elevations at a plurality of points on the earth's surface. The stored terrain map allows accurate position fixes to be obtained for surface users regardless of the deviation of the local terrain from the spherical or ellipsoidal model of the earth's surface.

8 Claims, 3 Drawing Sheets

OTHER PUBLICATIONS

G. K. O'Neill, "Satellite Air Traffic Control", *Astronautics & Aeronautics*, vol. 19, No. 3, pp. 27-31 (Mar. 1981).

G. K. O'Neill, "Satellite Instead", *AOPA Pilot*, vol. 25, No. 1, pp. 51-54 and 59-63 (Jul. 1982).

G. K. O'Neill, "Geostar", *AOPA Pilot*, vol. 26, No. 9, pp. 53-57 (Sep. 1983).

G. David, "Digital Airborne Equipment for AEROSAT", *Philips Telecommunication Review*, vol. 32, No. 4, pp. 225-236 (Dec. 1974).

J. W. O'Grady et al., "ATCRBS Trilateration: The Advanced Airport Surface Traffice Control Sensor", AGARD Conference Proceedings (No. 188) on Plans and Developments for Air Traffic Systems (Cambridge, Mass., May 20-23, 1975).

R. L. Garwin, "Satellite Systems for Navigation Air Traffic Control, Collision Avoidance, etc." (draft report dated Aug. 23, 1967).

R. L. Garwin, "Satellites for a Near-Term Application in Domestic Air Traffic Control" (draft report dated Jun. 19, 1970).

R. L. Garwin, "Over-All Air Traffice Control System Using Transponders and Communication Satellites", IBM Watson Research Laboratory (report dated Apr. 27, 1961).

"Improving the Nation's Air Traffic Control System", National Science Foundation, Washington, D.C.,. Appendix 3 (Mar. 1971).

*General Electric Review*, vol. 5, No. 5, pp. 14-15 (Sep. 1956).

H. E. Canney, Jr. et al., "The Uses of Artificial Satellite Vehicles: Part I", *Astronautica Acta*, vol. 2, No. 4, pp. 147-173 (1956).

H. E. Canney, Jr. et al., "The uses of Artificial Satellite Vehicles: Part II", *Astronautica Acta*, vol. 3, No. 1, pp. 1-15 (1957).

J. G. Norris, "Mapping Satellite Spots Missile Targets for U.S.", *Washington Post*, Oct. 28, 1964, p. A-1.

J. C. deLeon, "Synthetic Array Radar to Map the Surface of Venus", *Microwaves*, vol. 16, No. 1, pp. 12-14 (Jan. 1977).

K. Tomiyasu, "Bistatic Synthetic Aperture Radar Using Two Satellites", Eascon '78 Conference, IEEE Publication CH1352-4, pp. 106-110 (1978).

P. D. Perreault, "Civilian Receivers Navigate by Satellite", *MSN*, vol. 11, No. 1, pp. 61-62, 64, 66, 75, 77-78, 80, 85, 87-88, and 93 (Jan. 1981).

W. J. Senus et al., "GPS Application to Mapping, Charting and Geodesy", Navigation (Journal of the Institute of Navigation), vol. 28, No. 2, pp. 85-92 (Summer 1981).

J. Collins, "The Global Positioning System for Surveying—Today?", *POB*, Dec. 1982—Jan. 1983, pp. 50-54.

L. D. Hothem et al., "Report on Test and Demonstration of Macrometer Model V-1000 Interferometric Surveyor", Federal Geodetic Control Committee, Rockville, Md., Report No. FGCC-1S-83-2 (May 1983).

"New National Crustal Motion Network Uses Space-Measurement Systems", NOAA Geodetic News, No. 8, pp. 1-2 (Aug. 1, 1983).

"The Compute! Interview: Gerard K. O'Neill", *Compute!*, Aug. 1984, pp. 42-53.

J. Schefter, "Geostar", *Popular Science*, Feb. 1984.

W. Whalen, "Geostar Positioning System Using Satellite Technology", *Sea Technology*, Mar. 1984, pp. 31-34.

R. Temple, "You'll Never Have to Walk Alone", *London Times*, May 27, 1984.

E. H. Conrow, "A Parametric Analysis of TERCOm False Fix Probability", Proceedings of the IEEE 1978 National Aerospace and Electronics Conference (NAECON 78), May 16-18, 1978.

"Pilots Fly Geostar Approach", *Pilot News*, Dec. 1983, p. 24.

J. Sloan, "Knowing Where You Are", San Jose, Calif., *Mercury News*, Dec. 13, 1983.

"'Black Box' May Advance World of Communications", Hayward, California *Review*, Dec. 21, 1983.

POSITION DETERMINATION AND MESSAGE TRANSFER SYSTEM EMPLOYING SATELLITES AND STORED TERRAIN MAP

BACKGROUND OF THE INVENTION

1. Field of the Invention

The present invention relates generally to radio positioning and communication systems, and is particularly concerned with a radio position determination and message transfer system in which artificial satellites at known locations are employed as relay stations for the ranging and message signals.

2. Description of the Prior Art

The present invention constitutes an improvement or modification of the satellite-based position determining system described in U.S. Pat. No. 4,359,733, issued to G. K. O'Neill on Nov. 16, 1982. In that system, the user vehicles are equipped with transponders for transmitting a uniquely coded beacon or reply signal in response to a received general interrogation signal. Three repeater-carrying satellites are provided at spaced orbital locations above the earth for receiving and retransmitting the reply signals produced by the vehicle transponders. A ground station periodically transmits the general interrogation signal, and also receives and processes the reply signals retransmitted by the three satellites in order to determine the instantaneous positions of the user vehicles.

In order to avoid signal overlap and equipment saturation at the ground station, each vehicle transponder in U.S. Pat. No. 4,359,733 includes means responsive to the general interrogation signal for inhibiting the response of the transponder to subsequent general interrogation signals for a predetermined time interval following the response of the transponder to a first general interrogation signal. This avoids the need for discrete addressing of individual transponders, time-slotted polling, multiple frequencies, and the various other complex techniques which had previously been considered necessary to reduce signal overlap at the receiving station. In addition, the possibility of varying the inhibit interval allows the effective response rate to be modified for different classes of users, or for the same user during different periods of need, without changing the actual interrogation rate at the ground station.

The system described in U.S. Pat. No. 4,359,733 determines user position from the arrival times of the reply signals received from the three satellites, measured against the known transmission time of the interrogation signal from the ground station. The three time differences supply the necessary unknowns for a set of three equations, which can be solved simultaneously to yield the three-dimensional position of the user. This is particularly useful when the user vehicles comprise aircraft, since the altitude of a given aircraft can be determined directly along with its latitude and longitude, without reliance on the aircraft altimeter. By contrast, ground-based radar systems are incapable of determining aircraft height except very crudely, and must rely on aircraft-carried encoding altimeters for precise altitude information.

Although a system of three satellites is desirable from the standpoint of providing complete three-dimensional position information, the significant costs involved in placing satellites into orbit and maintaining the satellites make it attractive to consider whether a lesser number of satellites could be employed. A system of two satellites, for example, saves the cost of one satellite and can also serve as a functioning subset of a three-satellite system in case of a failure of one of the satellites. Although position determining systems relying on two satellites have been proposed in the prior art, these systems have generally depended on the use of vehicle-carried equipment for providing one of the position coordinates. In the case of aircraft, for example, the height coordinate can be provided by an altimeter and combined with the satellite-derived position information to obtain a complete position fix. Unfortunately, this method of calculating position is highly dependent on altimeter accuracy, which can be adversely affected by barometric fluctuations, improper adjustment, and other factors.

In the case of surface-based users such as automobiles, trains, ships and pedestrians, the situation is simplified somewhat since it is not necessary to calculate an altitude coordinate. For these classes of users, a system of two satellites can produce an approximate two-dimensional position fix (i.e., latitude and longitude) if one proceeds from the assumption that the earth is perfectly spherical, or, more accurately, ellipsoidal. Although this assumption is useful when rough or approximate position fixes are desired, it is not appropriate for precise position measurements since local terrain features are not taken into account. Differences in local terrain height on the earth's surface can amount to thousands of feet, and these differences will introduce substantial errors into the horizontal position calculation for surface-based users.

SUMMARY OF THE INVENTION

The present invention provides a satellite-based position determination and message transfer system which employs two satellites in combination with a stored terrain map in order to generate highly accurate position information. The system is particularly adapted to surface-based users, but can also be extended to non-surface users in certain situations.

A system in accordance with the present invention comprises a user-carried transceiver for receiving an interrogation signal and transmitting a reply signal in response to said interrogation signal; two satellites at spaced orbital locations above the earth, each of said satellites carrying repeater means for receiving and retransmitting the reply signal transmitted by the user-carried transceiver; and a ground station for periodically transmitting the interrogation signal and for receiving and processing the retransmitted reply signals from the two satellites. The ground station includes means for calculating the user position based on the arrival times of the retransmitted reply signals at the ground station, the transmission time of the interrogatin signal from the ground station, and the elevation of the user on the earth's surface. This elevation is derived from a stored terrain map which provides local terrain elevations at a plurality of points on the earth's surface. By virtue of the stored terrain map, accurate position fixes can be obtained for surface-based users regardless of the deviation of the local terrain from the spherical or ellipsoidal model of the earth's surface.

The system of the present invention is particularly effective when used in conjunction with one or more "benchmark" transceivers at known locations. These transceivers can be employed to generate the terrain map data that is stored at the ground station, and to periodically calibrate the system to compensate for satellite drift, varying ionospheric delays, and so on.

In addition to providing accurate position information for surface-based users, the present invention can also provide a precision approach capability for landing aircraft.

BRIEF DESCRIPTION OF THE DRAWINGS

The various objects, advantages, and novel features of the invention will be more readily apprehended from the following detailed description when read in conjunction with the appended drawings, in which.

Throughout the drawings, like reference numerals will be understood to refer to like parts.

DETAILED DESCRIPTION OF THE PREFERRED EMBODIMENT

General Description

Figure 1:
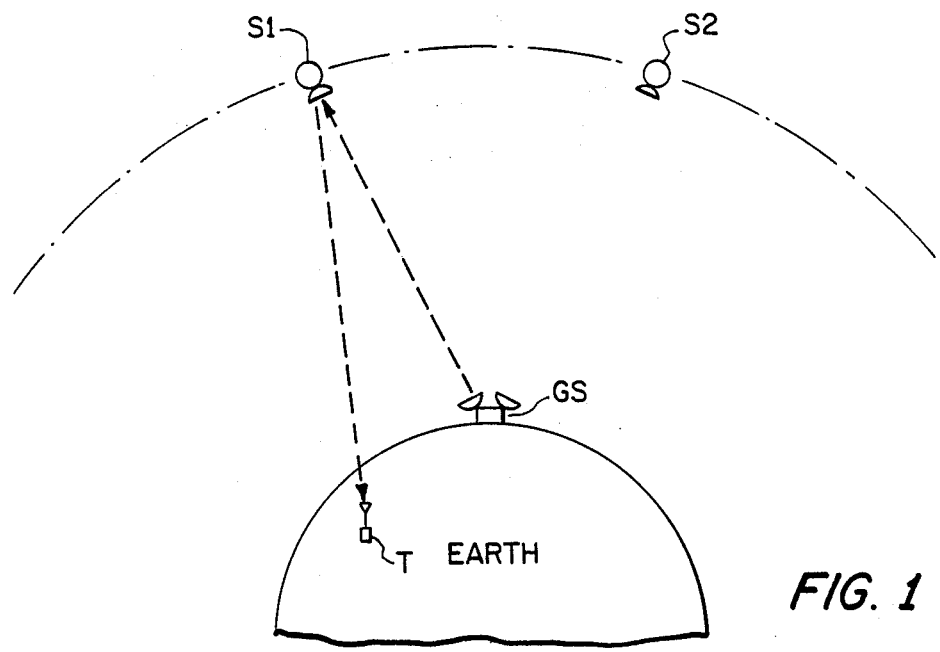
FIG. 1 depicts a preferred arrangement of satellites in accordance with the present invention, illustrating the manner in which an interrogation signal from the ground station is relayed to a surface-based user transceiver by one of the satellites.

In accordance with a preferred embodiment of the present invention, two repeater carrying satellites are placed in geostationary equatorial orbit around the earth, each satellite being location in a different longitudinal position in this orbit. Such an arrangement is illustrated in FIG. 1, where the two satellites are indicated at S1 and S2. It is to be understood that the present invention does not require that the satellites S1 and S2 be in geostationary orbit; they may instead have near-synchronous, nonsynchronous, elliptical, inclined or any other type of orbit in which their positions are readily ascertainable at any given time. In order to simplify analysis and to describe the operation of the invention in terms of a single fixed ground station, however, the satellites S1 and S2 will hereinafter be assumed to be in geostationary orbit about the earth in the general arrangement illustrated in FIG. 1.

With further reference to FIG. 1, the ground station GS periodically transmits an interrogation signal composed of a sequence of bits, referred to as an interrogation pulse group (IPG). The rate at which the IPGs are transmitted in the preferred embodiment of the invention is of the order of 100 IPGs per second. The IPGs are transmitted at frequency F1 to satellite S1, which translates the frequency to F3 and broadcasts the IPGs to the entire area serviced by the system. The sequence of IPGs are received by surface-based user transceivers such as the transceiver T shown in FIG. 1.

A feature of the present invention is that navigational position information may be requested at random by the user. This allows dynamic platforms such as high speed surface vehicles and aircraft to request position information more frequently than less dynamic platforms. This is accomplished in the present invention without a complex IPG addressed to a specific user. Assuming user T wishes current position information, the transceiver responds to the next received IPG by transmitting a reply signal in the form of a pulse group. The reply signal contains a ranging code, the user identification, and, possibly, a message, and is transmitted in synchronism with the reception of the IPG.

Figure 2:
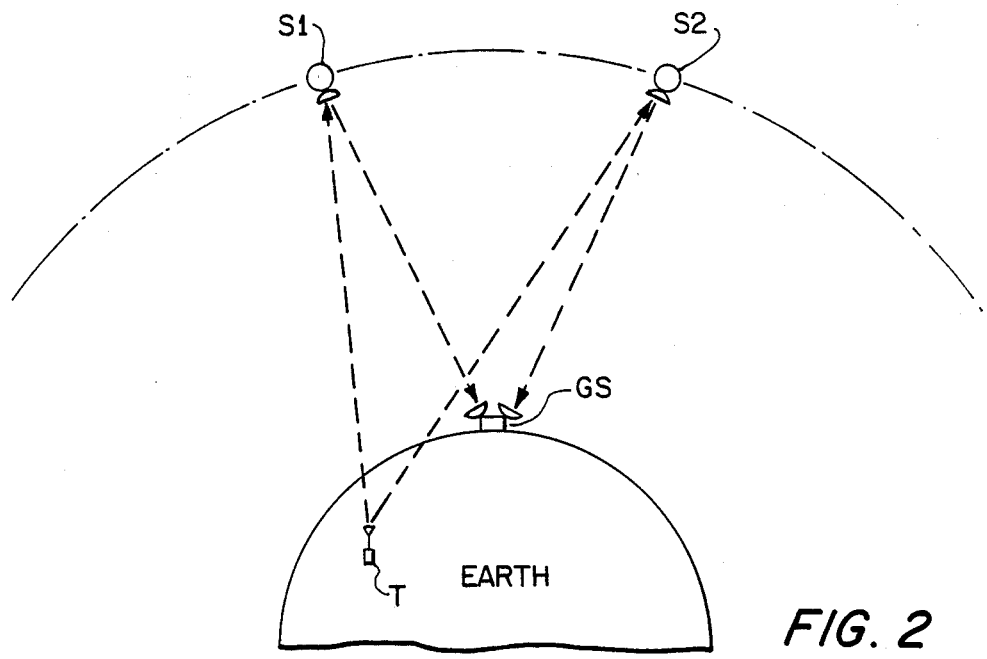
FIG. 2 illustrates the manner in which a reply signal from the surface-based user transceiver is received by each of the two satellites and retransmitted directly to the ground station.

With reference to FIG. 2, the reply signal is transmitted at frequency F4 to both satellite S1 and satellite S2. Each satellite transponds the reply signal at frequency F2 to the ground station GS. Based on the known positions of satellites S1 and S2, the time of transmission from the ground station of the IPG, and the times of reception at the ground station of the transponded reply signals, the ground station can calculate the separation distance between satellite S1 and the user and the separation distance between satellite S2 and the user. Based on this information, the user is known to lie on a sphere of radius D1 centered on satellite S1 and simultaneously on a sphere of radius D2 centered on satellite S2. Since the line of intersection of the surfaces of two spheres is a circle, the user is located at some point on a circle, the line of position (LOP), as shown in FIGS. 3 and 4.

Figure 3:
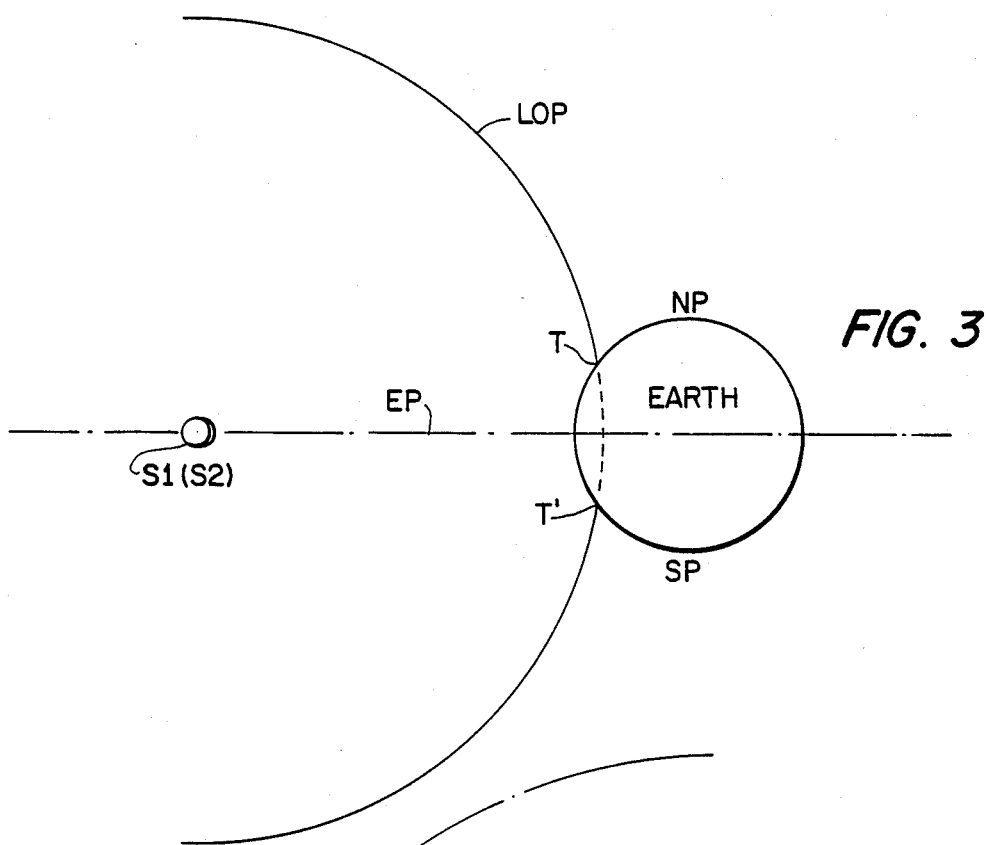
FIGS. 3 and 4 illustrate the geometrical basis for the calculation of the surface-based transceiver's position.
Figure 4:
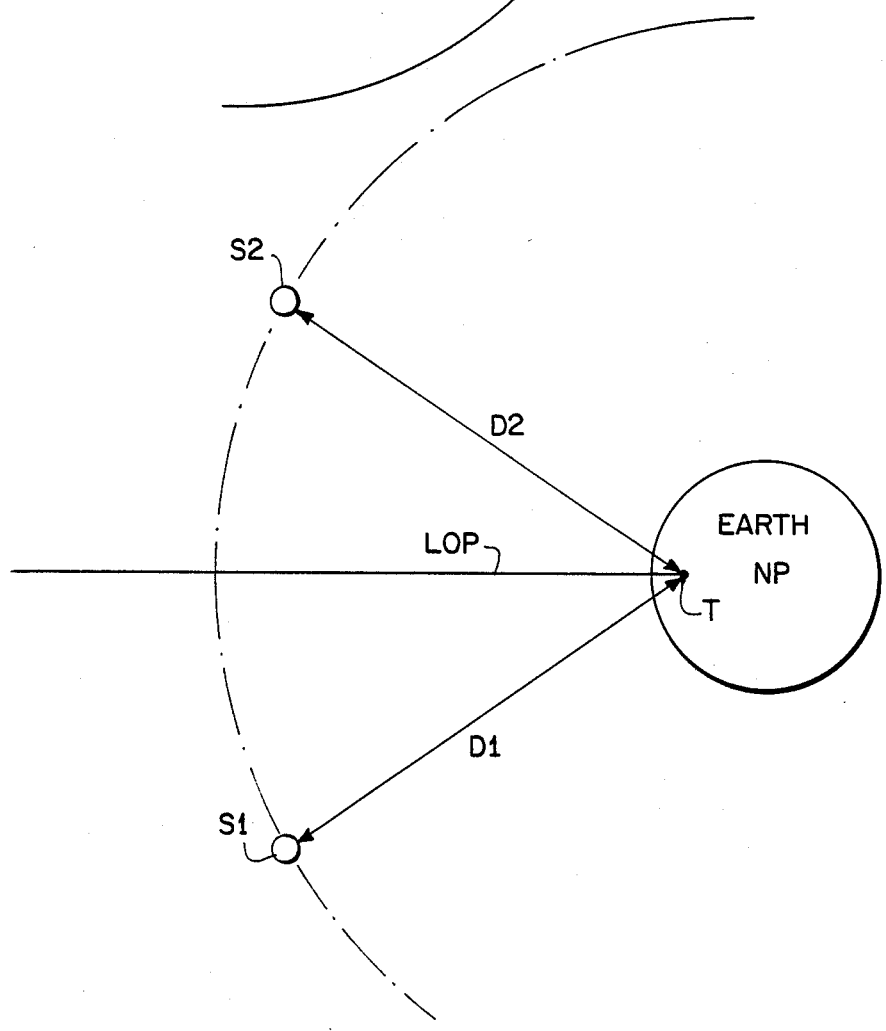

FIG. 3 is a view along the equatorial plane (EP) and FIG. 4 is a view from directly above the north pole (NP). Note that a line connecting the two satellites would pass through the center of the LOP circle at right angles to the plane of the circle. In FIG. 4, the circle is seen on edge and appears as a straight line.

With further reference to FIGS. 3 and 4, the LOP passes through the surface of the earth at two points T and T' which are symmetrically located in the northern and southern hemispheres. One of the two possible user positions can be eliminated based on general knowledge of the user location. Optionally, this information can be provided by the user from time to time as part of the user's reply to the IPG. The exact user position is obtained by calculating the point at which the position circle passes through the surface represented by a stored terrain map. This intersection yields the desired latitude, longitude, and elevation of the user.

The exact user position and the computed time at which the user responded is encoded into a binary message, addressed to the specific user, and included in one of the next IPGs to be transmitted. The IPG is transponded by satellite S1 (or S2) and the position message is received and decoded by the user. The response time of the system, that is, the time delay between a user request for position and the receipt of the position message by the user, is normally in the range of 0.6 second.

The possibility exists that user reply signals from two different users could arrive at one or both satellites at approximately the same time and therefore overlap. This possibility may be dealt with in several ways. First, as disclosed in U.S. Pat. No. 4,359,733, each user transceiver may be arranged to disable itself for a non-precision time interval after it responds to an interrogation signal. For a user updating his position once every 10 seconds, this means that his transceiver will respond to only one in 1000 interrogations. The brevity of the user response also reduces the chance of overlap. Second, users may respond using different psuedo-random noise codes (PN codes). While not greatly improving overall system capacity when compared to uncoded short replies, this method permits approaching the theoretical limit of channel capacity while requiring only a low peak power in the user transceiver. Next, the satellites may employ spot beams so that users in different geographic areas may reply simultaneously, their transmissions being received at the satellites in different spot beams and relayed to the ground station on different downlink channels. In a preferred embodiment, the satellite antennas may user 15-20 spot beams of 1.3° beamwidth to cover the 48 contiguous states of the United States (CONUS). Selector-combiner circuitry is employed to activate the beam which first receives a user reply signal and to inhibit the remaining beams for the duration of the reply signal. Thus, the signal in the selected beam is not affected by overlaps with signals from users located in areas serviced by the inhibited beams. Next, as disclosed in U.S. Pat. No. 4,359,733, the ground station may perform a measurement of total signal transmission length, in order to reject those signals which are of greater than normal length, as would be produced by an overlap of two transmissions. Finally, as an overall check against false data, each user reply may include a polynomial check code or other type of check code. In the event that this check code is not satisfied when the ground station computer calculates it, the ground station will not send the position information or message acknowledgement to the user transceiver. In that case, after a predetermined delay, the transceiver may be arranged to automatically retransmit the reply signal. The timing of the repeated reply signal by each user may be randomized to minimize the probability of another overlap.

Figure 5:
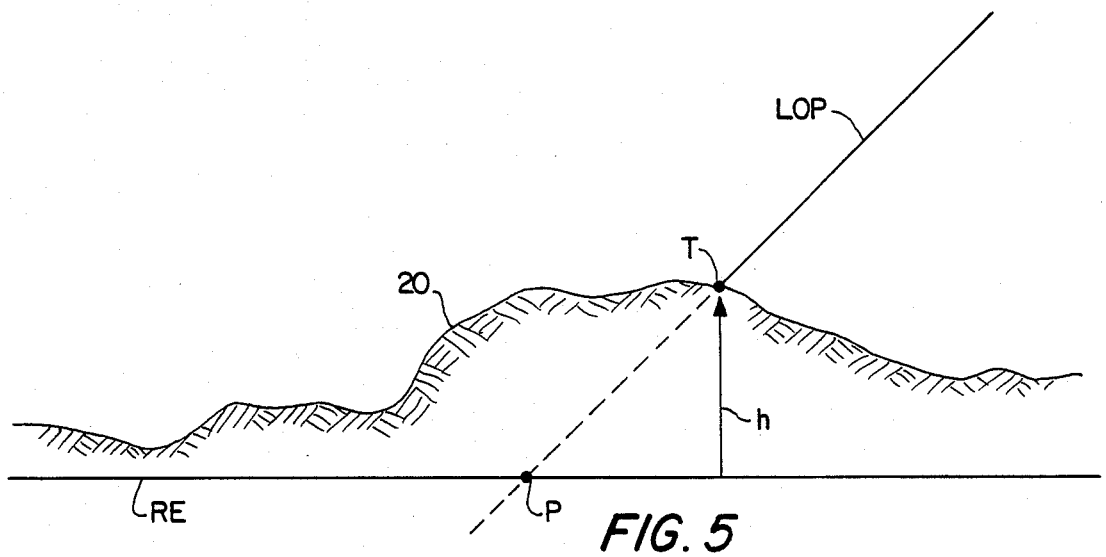
FIG. 5 is an enlarged sectional view of the local terrain profile at the transceiver position.

The use of the stored terrain map in the present invention removes a source of potential inaccuracy. For a user located in CONUS the LOP forms an angle with the earth's surface of approximately 45° as illustrated in FIG. 5. If the user is located on elevated terrain 20, as shown, the present invention compensates for this elevation and provides precise position information. Were the system to use an ellipsoidal model of the earth rather than the terrain map, the horizontal position error incurred would be of the same order of magnitude as the user's elevation. For example, the latitude and longitude of user T shown in FIG. 5 based on the intersection of the LOP with the reference ellipsoid (RE) would differ from the true latitude and longitude by a distance of the same order of magnitude as the user elevation, h. Further, since the two satellites and the center of the earth are widely separated, the effect of range errors on position errors is likely to be less severe than in systems which employ three or more satellites without the user of a stored terrain map to determine position. In effect, the geometric dilution of precision (GDOP) is reduced.

The proposed invention has additional capabilities and features beyond those previously described. In addition to the capability to transmit messages from the ground station to the user, the system can transmit messages from the user to the ground station. This would allow for emergency help requests in case of accidents, threats to personal security, and so on. Further, since users can communicate messages to the ground station, aircraft in flight can provide altimetry information to the ground station automatically in the reply signal. The ground station can calculate the aircraft position based on the aircraft altitude rather than on a stored terrain map. In this case, the position accuracy is of the same order of magnitude as the aircraft altimeter accuracy, typically 50 to 150 feet. Thus the potential users will include aircraft, terrestrial vehicles, marine vehicles, and pedestrians.

The present invention can be configured to provide essentially worldwide service. FIGS. 1-4 illustrate a two-satellite configuration which would provide service to a regional area such as North and South America. By providing additional satellites, any point on the earth in view of at least two satellites could be serviced.

Transceivers located at precisely known locations can be used as benchmarks in the present invention. That is, the signals from the benchmark transceivers can be periodically used to calibrate the system and eliminate uncertainties due to satellite orbit variations, ionospheric delays, imperfect knowledge of the shape of the earth (the geoid) and varying delays in the satellites.

Position Computation

Referring to FIGS. 1-5, a method will be described for calculating the position coordinates of the user T based on a stored terrain map and on the measured arrival times T1 and T2 of the return signals produced in response to an interrogation signal generated by the ground station at time T0. For convenience, the calculation is carried out in terms of spherical coordinates of the usual form $(r, \theta, \phi)$, wherein r is measured from the earth's center, $\theta$ equals 90° minus latitude, and $\phi$ represents longitude from the Greenwich Prime Meridian. Therefore the respective coordinates of the ground station GS, satellites S1 and S2 and user T may be expressed as follows:

Ground station: $(r_{GS}, \theta_{GS}, \phi_{GS})$
Satellite S1: $(r_{S1}, \theta_{S1}, \phi_{S1})$
Satellite S2: $(r_{S2}, \theta_{S2}, \phi_{S2})$
User: $(r_T, \theta_T, \phi_T)$ All sets of coordinates other than those for the user T are known. Other necessary quantities which are known or measurable are the interrogation signal transmission time T0, the response delay $T_D$ of the user transceiver and the response delay $T_S$ of the satellite repeaters, which is assumed to be the same for both satellites at the frequencies which are involved in the position calculations. It is further assumed that all signals travel uniformly at the speed of light (c). To the extent that either of these assumptions is inaccurate in a particular case, it is a routine matter to make the appropriate corrections in the equations that follow.

In general, the straight-line distance between two points $(r_0, \theta_0, \phi_0)$ and $(r_i, \theta_i, \phi_i)$ is expressed as follows:

$$d = [(r_i \sin\theta_i \cos\phi_i - r_0 \sin\theta_0 \cos\phi_0)^2 + (r_i \sin\theta_i \sin\phi_i - r_0 \sin\theta_0 \sin\phi_0)^2 + (r_i \cos\theta_i - r_0 \cos\theta_0)^2]^{\frac{1}{2}} \quad (1)$$

Therefore the transit time $\Delta T$ of a signal traversing this distance at the speed of light (c) would be expressed as:

$$\Delta T = (1/c)[(r_i \sin\theta_i \cos\phi_i - r_0 \sin\theta_0 \cos\phi_0)^2 + (r_i \sin\theta_i \sin\phi_i - r_0 \sin\theta_0 \sin\phi_0)^2 + (r_i \cos\theta_i - r_0 \cos\theta_0)^2]^{\frac{1}{2}} \quad (2)$$

As a convenience, the right side of equation (2) may be expressed in functional notation as follows:

$$\Delta T = f[(r_0, \theta_0, \phi_0), (r_i, \theta_i, \phi_i)] \quad (3)$$

This notation will be employed consistently hereinafter, keeping in mind that the function f is merely a shorthand for the complete, albeit much longer, expression on the right side of equation (2).

It should be readily apparent that the distance measurement, and hence the transit time, will be the same if the coordinates of the two points $(r_0, \theta_0, \phi_0)$ and $(r_i, \theta_i, \phi_i)$ are interchanged in equations (1) and (2). In terms of the shorthand functional notation defined above, this means that:

$$f[(r_0, \theta_0, \phi_0), (r_i, \theta_i, \phi_i)] = f[(r_i, \theta_i, \phi_i), (r_0, \theta_0, \phi_0)] \quad (4)$$

With reference to FIGS. 1 and 2, it will be seen that the difference between the time T0 of transmission of the interrogation signal from the ground and the time of arrival T1 at the ground station of the return signal associated with the satellite S1 will be:

$$T1 - T0 = f[(r_{S1}, \theta_{S1}, \phi_{S1}), (r_{GS}, \theta_{GS}, \phi_{GS})] + T_S + f[(r_T, \theta_T, \phi_T), (r_{S1}, \theta_{S1}, \phi_{S1})] + T_D + f[(r_{S1}, \theta_{S1}, \phi_{S1}), (r_T, \theta_T, \phi_T)] + T_S + f[(r_{GS}, \theta_{GS}, \phi_{GS}), (r_{S1}, \theta_{S1}, \phi_{S1})] \quad (5)$$

Applying equation (4) and combining terms yields:

$$T1 - T0 = 2f[(r_{S1}, \theta_{S1}, \phi_{S1}), (r_{GS}, \theta_{GS}, \phi_{GS})] + 2T_S + T_D + 2f[(r_{S1}, \theta_{S1}, \phi_{S1}), (r_T, \theta_T, \phi_T)] \quad (6)$$

The equation for the return signal from the satellite S2 is longer since both satellites are involved in the path. The equation for satellite S2 is:

$$T2 - T0 = f[(r_{S1}, \theta_{S1}, \phi_{S1}), (r_{GS}, \theta_{GS}, \phi_{GS})] + f[(r_T, \theta_T, \phi_T), (r_{S1}, \theta_{S1}, \phi_{S1})] + f[(r_{S2}, \theta_{S2}, \phi_{S2}), (r_T, \theta_T, \phi_T)] + f[(r_{GS}, \theta_{GS}, \phi_{GS}), (r_{S2}, \theta_{S2}, \phi_{S2})] + 2T_S + T_D \quad (7)$$

Equations (6) and (7) form a set of two equations in which the user coordinates $(r_T, \theta_T, \phi_T)$ are the only unknowns, the remaining quantities being known or directly measurable. As previously discussed, each equation represents a sphere centered on one of the satellites and the simultaneous solution of the two equations, the LOP, is a circle.

The additional information needed to complete the position determination is provided by the stored terrain map. Terrain maps in digital form are currently available for many areas of the earth. For example, a terrain map, or digital elevation model (DEM) as it is usually called, is available for CONUS plus Alaska and Hawaii from the National Cartographic Information Center. The DEM provides the elevation at each point in a rectangular array. The points are separated by 30 meters in the east-west direction and by 30 meters in the north-south direction. The elevation accuracy is 15 feet or less.

A computer in the ground station is used to solve equations (6) and (7) in order to determine the expression for the LOP circle. A look-up procedure is then used to calculate the exact position at which the circle crosses the terrain surface described by the stored terrain map. The terrain surface between the array points of the DEM is determined by interpolation.

In order to simplify the position calculation, it is preferable to configure the stored terrain map so that for a given input point P in FIG. 5 (representing the intersection of the calculated LOP with the reference ellipsoid RE) the memory reads out the terrain height h at the intersection point T of the LOP and the terrain surface, rather than the terrain height directly (i.e., vertically) above the point P. This is possible because, in the case where the satellites S1 and S2 are geostationary, any given point P on the reference ellipsoid RE will be associated with a unique LOP which intersects the RE at a known angle. The height h allows the ground station computer to calculate the exact position of the user transceiver T along the LOP so that a precise position fix can be obtained.

Slow diurnal changes in the positions of the geostationary satellites (on the order of 0.1°) may be monitored by means of benchmark transceivers or by employing independent satellite tracking techniques. In order to compensate for these changes in the position calculation, the ground station computer can be arranged to calculate the angular differences between the ideal LOPs and the actual LOPs, and to continuously update and store these differences as the satellite positions shift. During the position calculation, the calculated intersection point P between the LOP and the reference ellipsoid RE can be adjusted, using the stored angular differences, to obtain a corrected point $P_0$ on the reference ellipsoid RE. The corrected point $P_0$ can then be applied as the input to the terrain map memory to obtain the terrain height h at the user location.

The present invention may also employ a more conventional form of terrain map which, for any given point P on the reference ellipsoid RE, stores the terrain height directly (i.e., vertically) above that point. In this case, additional steps are necessary in the position calculation to account for the horizontal offset between the point P and the user location T. The simplest method, which is useful in areas of fairly level terrain, is to employ a direct trigonometric calculation. Referring to FIG. 5, and assuming that the satellites S1 and S2 are geostationary, it can be observed that the LOP will intersect the reference ellipsoid RE at a known angle which depends on latitude. The complement of this angle (i.e., the angle between the LOP and a line perpendicular to the RE), together with the terrain height directly above the point P as read from the stored terrain map, can be used to calculate the approximate horizontal displacement between the point P and the user transceiver T along the LOP direction. From this, the approximate horizontal position coordinates of the user transceiver can be obtained.

As an alternative to the trigonometric method, an iterative procedure may be used to obtain the user position when the terrain map is of the type just described.

This method provides a better approximation of the user position in areas of steep or rugged terrain, although it imposes a greater burden on the ground station computer. The iterative procedure is as follows:

(1) Calculate the horizontal position, $L_1$, (latitude and longitude) of the intersection of the LOP with the reference ellipsoid (RE). This corresponds to point P in the example shown in FIG. 5.

(2) Obtain the elevation $E_1$ of horizontal position $L_1$ from the stored terrain map.

(3) Calculate the horizontal position $L_2$ at which the LOP passes through elevation $E_1$.

(4) Obtain the elevation $E_2$ of the horizontal position $L_2$ from the stored terrain map.

(5) Calculate the difference $E_2-E_1$.

(6) Repeat steps (3) through (5), generating a sequence of horizontal positions and elevations $L_i$, $E_i$, $L_{i+1}$, $E_{i+1}$ and so on, until the difference $E_{i+1}-E_i$ is sufficiently small, or until a predetermined number of iterations have been performed.

For the vast majority of terrain areas, the iterative procedure converges quickly. For example, on level ground only one iteration is required for the difference $E_2-E_1$ to be acceptably small. In rugged terrain where the slope of the ground is comparable to or greater than the elevation angle of the LOP, the iterative procedure may converge more slowly. For this reason, an iteration limit is provided to avoid excessive loading of the ground station computer.

In the preferred embodiment of the invention, the stored terrain map is of the type first discussed; that is, for a given point P on the reference ellipsoid RE, the memory reads out the terrain height h at the intersection point between the LOP and the terrain surface. This allows the position of the user transceiver T to be obtained directly without relying on the trigonometric or iterative approximations described above, thereby reducing the computational burden on the ground station computer.

The frequency of IPG repetitions, 100 IPGs per second in the preferred embodiment, results in a special form of position ambiguity. The user reply signal which arrives at the ground station at time T1 could have been transmitted in response to any of several IPGs, resulting in a multiplicity of possible user positions. However, the minimum separations between possible locations is equal to the quantity (0.01 sec/2) multiplied by the speed of light, or 1500 km. This of ambiguity can be resolved most simply by approximate knowledge of the user position, obtained by using the message capability of the system to interrogate the user on a one-time or occasional basis to determine the user's general vicinity (e.g., the particular state of the United States in which the user is located).

Signal Formats

Figure 6:
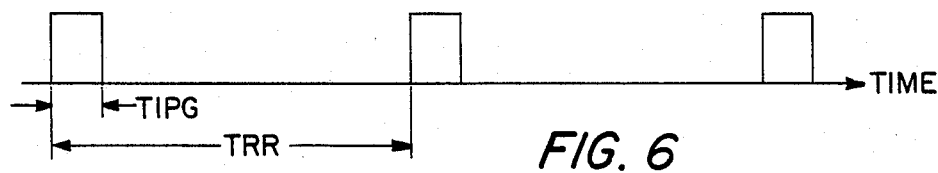
FIGS. 6 and 7 illustrate an exemplary format for the interrogation signals generated by the ground station.

The signal formats for the signals which are exchanged between the ground station and the user are shown in FIGS. 6, 7, 8 and 9. The general nature of the sequence of IPGs transmitted by the ground station is illustrated in FIG. 6. In the preferred embodiment, the IPG repetition interval (TRR) is 0.01 second.

Figure 7:
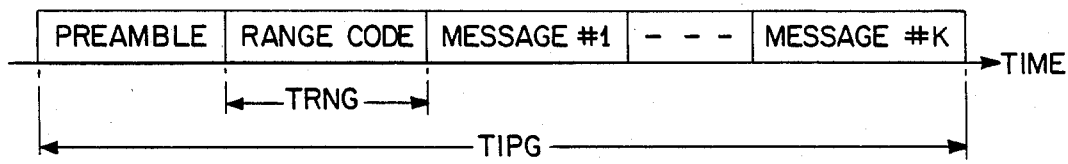

A more detailed illustration of the IPG is shown in FIG. 7. The preamble contains housekeeping information which is used by the satellite. The range code is a pattern of bits to which the transceiver range code detectors are matched. The messages are 256 bits each and a variable number of messages is contained in each IPG. These messages comprise position information requested by the users and messages being exchanged between users.

Figure 8:
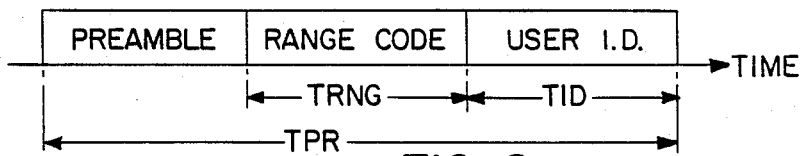
FIGS. 8 and 9 illustrate exemplary formats for the reply signals generated by the user transceivers.
Figure 9:
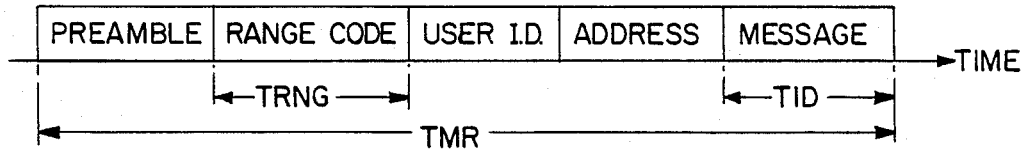

The user reply signal format used when requesting only position information is shown in FIG. 8. In addition to the preamble and range code, the reply signal includes the user's unique identification number, or user I.D. The form of user reply signal format employed when the user wishes to communicate messages is shown in FIG. 9. This format includes a destination address specifying another user transceiver or the ground station, together with the test of the message and an embedded check code. The preamble shown in FIGS. 8 and 9 consists of two bits used to activate the satellite selective combiner, which will be described subsequently.

As an option, communications between the user transceivers and the ground station via the satellites S1 and S2 may employ spread spectrum techniques with code division multiple access (CDMA). The uplink from the user transceivers to the ground station operates on a random time-division multiple access (RTDMA) basis, whereas the downlink from the ground station to the user transceivers is serial or non-random (i.e., computer controlled) TDMA. In the operation of the CDMA, the user transceivers may be divided into a number of different groups (e.g., 30), with the transceivers of each group arranged to transmit using a particular pseudo-random noise code (PN code). At the ground station, 30 banks of decoders may operate in parallel, each with several backups, so that many user transceivers can transmit information simultaneously. This arrangement allows a high traffic capacity with a smaller satellite antenna and lower transceiver power requirement. The uplink communications can employ different PN codes, one for each of the satellites, in order to allow the satellite transmitters to operate simultaneously without contributing significantly to noise. This permits a significant reduction in the power requirement of the satellite transmitters.

Transceiver Circuitry

Figure 10:
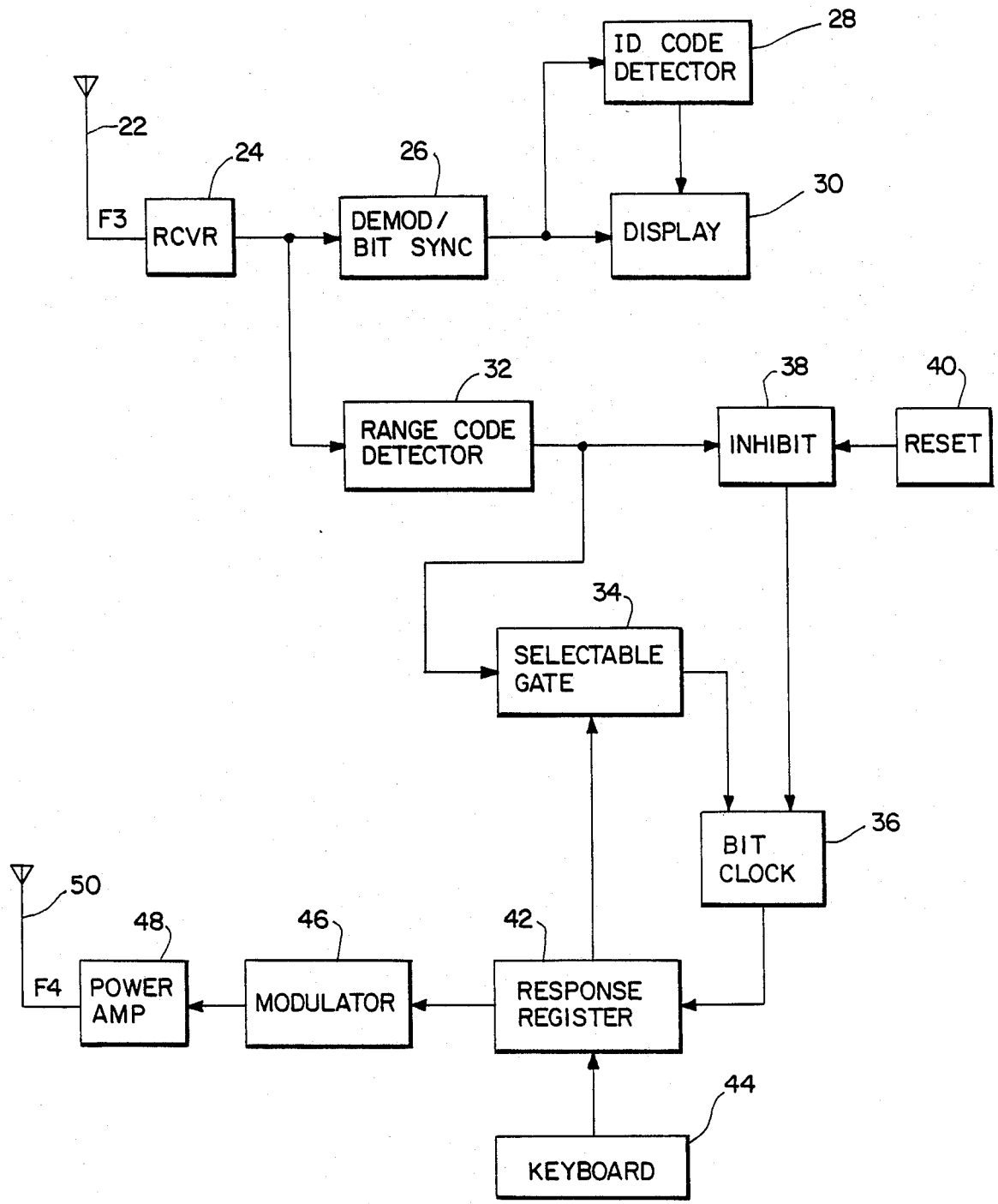
FIG. 10 illustrates the internal components of the user transceivers.

A block diagram of the transceiver circuitry which is capable of generating the reply signals of FIGS. 8 and 9 is shown in FIG. 10. It is to be understood that, although the block diagram of FIG. 10 represents a preferred circuit arrangement, other circuits may be used depending on the type of reply signal that is generated and on the requirements of particular applications.

The interrogation signal from the ground station GS is relayed to the user by satellite S1 at frequency F3 and is captured by the receive antenna 22. The receive antenna may be implemented as a simple half-wave dipole. In the preferred embodiment, the interrogation signal format shown in FIG. 7 is modulated onto the carrier at F3 via phase shift keying (PSK). In the present example, the range code indicated in FIG. 7 is 64 bits long, enough to ensure adequate detection performance by transceivers which are inexpensive and simple in design.

The captured signal is applied to the receiver 24 which provides the necessary low-noise amplification and down conversion to an intermediate frequency suitable for operation of the subsequent demodulator and bit synchronization unit 26 and range code detector 32. The demod/bit-sync unit 26 performs non-coherent (DPSK) detection of the interrogation signal shown in FIG. 7 and provides the signal decoding function necessary to extract any position reports or other user messages. This technique provides acceptable bit error rate performance without the complexity of a carrier tracking loop in each transceiver. However, a simple carrier tracking loop may be employed in the transceiver if desired. Position reports and other messages addressed to a specific user are identified by means of the specific I.D. code for that user. The I.D. code detector 28 performs a digital correlation on the demodulated baseband signal. When the specific user I.D. code assigned to that user is detected, the display 30 is enabled and the message or position report containing the user's I.D. code is displayed to the user.

The range code detector 32 examines the input intermediate frequency (IF) analog waveform from the receiver 24 and provides a trigger pulse output when it detects the presence of the range code depicted in the exemplary signal format in FIG. 7. The detector itself is a passive matched filter and consists of a tapped delay line followed by an envelope detector and one shot. Alternatively, a surface acoustic wave (SAW) device may be used. Conventional technology can be used in the detector's implementation. The trigger pulse output from the range code detector 32 is applied simultaneously to a selectable gate 34 and to an inhibit circuit 38. The operation of the inhibit circuit 38 is dependent on the mode of transceiver operation, as will be discussed shortly. The selectable gate 34 operates the bit clock 36 for a sufficient period of time to allow a single transceiver reply signal to be transmitted. The selectable gate 34 provides a gating pulse at its output whose pulse width is user-determined from one of two options. The first option provides a pulse width long enough to encompass the total number of bits necessary to transmit the user position request (PR) shown in FIG. 8. The second option provides a pulsewidth long enough to encompass the total number of bits necessary to transmit the user message request (MR) shown in FIG. 9. The second option is automatically selected by the transceiver whenever a user initiates a message request through the keyboard 44. Otherwise, the first option is enabled.

In normal operation, when the user desires position information, this is requested by means of the reset device 40. The reset device 40 temporarily overrides the inhibit 38, allowing the next incoming IPG to trigger a response from the user transceiver. In this mode, the inhibit circuit 38 always inhibits the bit clock 34 unless overridden by the reset device 40.

In a second mode of operation, which is useful for continuous monitoring of transceiver location by the ground station, the inhibit circuit 38 is enabled immediately following the transmission of a user reply signal for a predetermined non-precision inhibit interval $T_i$ (typically much greater than the IPG repetition interval TRR of FIG. 6). Following this interval, the inhibit function becomes ineffective until the transceiver responds to the next received IPG. Thus the ground station has position information for this transceiver which is updated approximately every $T_i$ seconds.

The purpose of the inhibit circuit is to reduce the effective response rate of the user transceivers by causing the transceivers to respond to only a certain fraction of all IPGs. This reduces the incidence of reply signal overlap at the ground station and also reduces the burden on the ground-based position computation equipment. The inhibit interval can be made different for different classes of users, and can be varied for a given user during different periods of need. An exemplary construction for the inhibit circuit 38 is set forth in the aforementioned U.S. Pat. No. 4,359,733, which patent is expressly incorporated herein by reference.

With continued reference to FIG. 10, the reply of the transceiver to an IPG will include a preamble, range code, user I.D., an embedded check code, and, optionally, an address specifying a message destination together with a message intended for that destination. These items are loaded into the response register 42. The contents of this register are shifted to the modulator 46 at a time and rate determined by the bit clock 36. A PSK modulated signal drives the power amplifier 48 and the signal is radiated to both satellites S1, S2 via the antenna 50. The receive and transmit antennas 22 and 50 may be implemented as the same physical antenna, if desired, through the use of diplexer circuitry to separate the receive and transmit functions.

Satellite Equipment

For the most part, the satellites required by the present system need merely contain receiving and transmitting circuitry for relaying IPGs and user replies between the ground station GS and the user transceivers. However, as subsequently described, the preferred circuit arrangement includes additional features which enhance the throughput performance of the system and reduce the DC power requirement on the satellites. All critical time measurement circuitry used for position determination is placed at the ground station, so that this circuitry can be improved and upgraded as the electronic art advances without the necessity of replacing any of the satellites.

As previously described and illustrated in FIG. 2, the reply signal from the surface-based user transceiver T is relayed, through both satellites S1 and S2 in the system, back to the ground station GS. The ground station receives the two relayed or retransmitted reply signals via two highly directional antennas, one pointed at each satellite. Thus, as shown in FIG. 2, the ground station GS will receive two time-spaced return signals, both at the same frequency F2, for each reply signal originating from the user transceiver T.

Although only one of the two satellites S1, S2 is used to relay the interrogation signal and messages from the ground station to the user transceivers, as shown in FIG. 1, the circuitry of the two satellites is identical. Hence, either one may be selected to perform this function.

Figure 11:
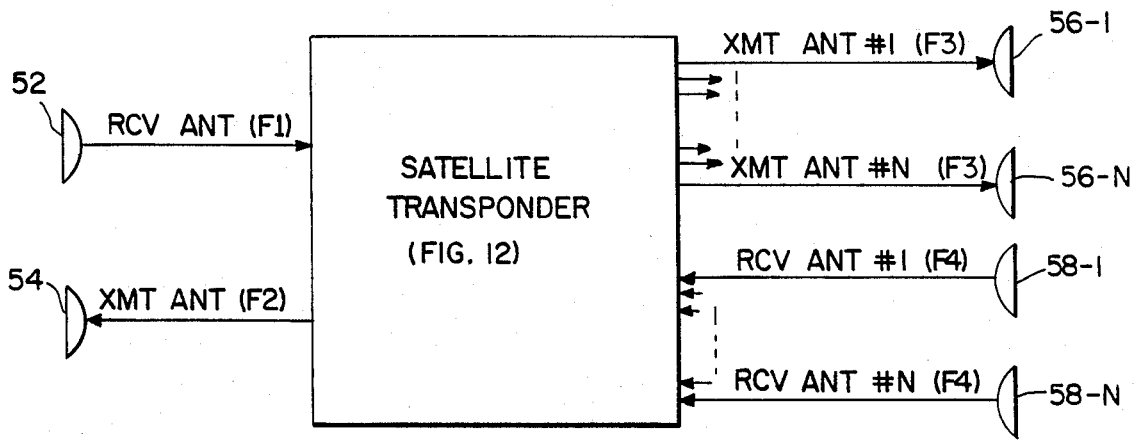
FIGS. 11 and 12 illustrate the equipment carried by the two relay satellites.
Figure 12:
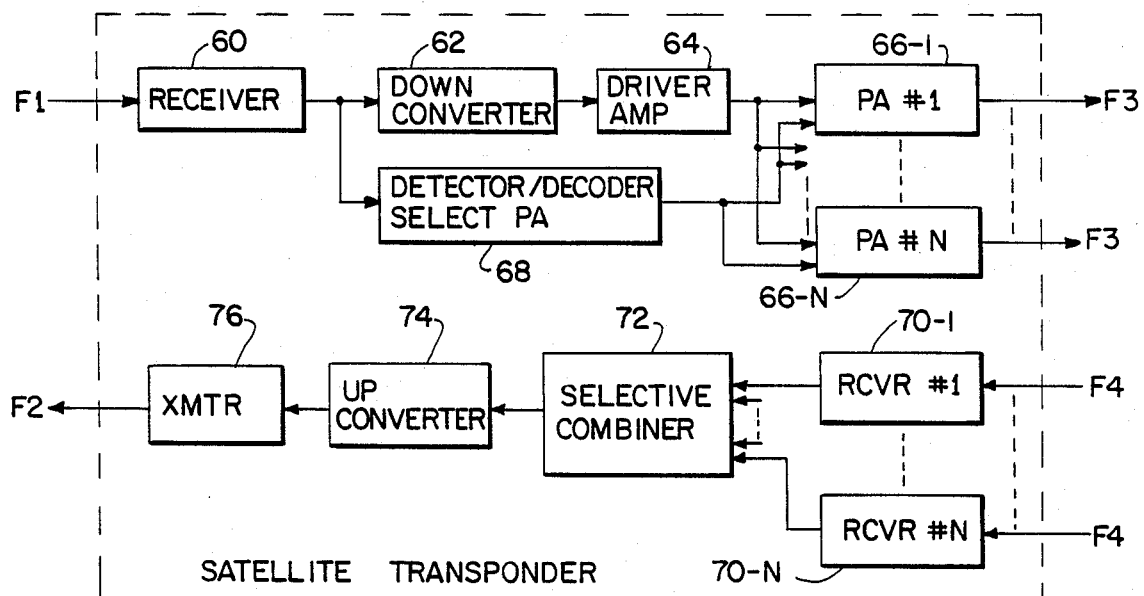

FIGS. 11 and 12 illustrate the satellite payload circuitry. FIG. 11 provides an overview while FIG. 12 depicts salient components of the payload transponder. Referring first to FIG. 11, interrogation signals transmitted by the ground station GS at frequency F1 (6533 MHz in the present example) are captured by the satellite receive antenna 52. Similarly, the relayed reply signals from the user transceivers T are radiated by the satellite transmit antenna 54 at frequency F2 (5125 MHz in the present example) down to the ground station GS. Although two physically distinct antennas are shown, a conventional implementation using a single parabolic reflector, a single feedhorn assembly, and a transmit/receive diplexer is preferred. The interrogation signals relayed to the user transceivers are radiated at frequency F3 (2492 MHz in the present example) by a set of N antennas 56-1 through 56-N. The N antennas define overlapping spot beams which divide the serviced sector of the earth's surface into contiguous zones. Analogously, the reply signals transmitted at frequency F4 (1618 MHz in the present example) by the user transceivers are captured by a set of N spot beam antennas 58-1 through 58-N. Similar to the previous comment, it is not necessary to use 2N physically distinct antennas for the links between the satellite and the user transceivers. The preferred implementation utilizes a single reflector. Furthermore, one feedhorn assembly (including a transmit/receive diplexer) for each of the N pairs of transmit/receive paths is preferred. All of the aforementioned components are conventional in design and can be fabricated from readily available parts.

The satellite transponder referenced in FIG. 11 and illustrated in FIG. 12 provides the amplification and frequency translation necessary to relay signals between the ground station GS and the user transceivers T. Signals from the ground station captured by the satellite receive antenna 52 are sequentially passed through a low-noise amplifying receiver 60, a down converter 62, a driver amplifier 64, and one or more power amplifiers 66-1 through 66-N. Each power amplifier is individually attached to its own transmit antenna, or, more accurately, to its own diplexer/feedhorn assembly combination, as depicted in FIG. 11 by items 56-1 through 56-N. The block 68 in FIG. 12 labelled DETECTOR/DECODER SELECT PA enables the satellite transponder to automatically respond to coded instructions from the ground station GS which are inserted into the signal and to automatically route that signal to one or more of the power amplifiers 66-1 through 66-N.

In operation, the DETECTOR/DECODER SELECT PA unit routes the range code into all horns so that every user receives 100 range codes per second. Messages intended for a specific user are routed only to the horn which services the zone containing that user, this zone being known from previously calculated position information. This is an important factor in conserving satellite power. Alternatively, to reduce the total amount of data flow required from the ground station and to avoid the necessity for rapid decisions at the satellite as to which horn a message should be sent through, the circuitry on board the satellite may simply be programmed to route the incoming ground station messages to one or another of the N power amplifiers 66-1 through 66-N on a predetermined time sequence (e.g., 30 milliseconds for power amplifier 66-1, 60 milliseconds for power amplifier 66-2, and so on). The ground station can then select the particular amplifier, and therefore the particular spot beam, which is to be used for a specific message simply by choosing the proper time slot in which to send the message. The balance and weighting of the time slots may be changed from time to time by slow commands to an onboard satellite computer, as the signal traffic load changes in the course of a day.

A response signal transmitted by the user transceiver T is captured by one or more of the receive antennas 58-1 through 58-N depicted in FIG. 11. Each antenna (i.e., each diplexer/feedhorn assembly) is attached to its individual receiver 70-1 through 70-N as shown in FIG. 12. The reply signal is subsequently passed to a selective combiner 72, an up converter 74, and finally a transmitter 76 before being radiated to the ground station at frequency F2 by antenna 54. The receivers 70-1 through 70-N, up converter 74, and transmitter 76 are all conventional in design and are fabricated from readily available parts. Accordingly, a detailed description of these blocks is not necessary.

The selective combiner 72 depicted in FIG. 12 is an electronic switch which, at any one instant, connects the up converter 74 to the output of one and only one of the receivers 70-1 through 70-N. The combiner continually senses which one of the N receivers contains a reply signal, and, in effect, squelches the output of all other receivers for the duration of the detected signal. This implementation is favored primarily because it enables a spectrum-efficient design and, relative to the received reply signals, provides statistical multiplexing on a first-come, first-served basis. It reduces the average system throughput degradation caused by overlap (simultaneous arrival) at the satellite of two or more reply signals originating in different antenna zones. (Overlaps which occur between reply signals originating in the same receive antenna zone, however, do not benefit.) Without the squelching action, all overlapping reply signals must be repeated. With the squelching action, one less response signal from a user transceiver must be retransmitted. Furthermore, the preferred implementation provides a means of preventing the degradation of throughput channel signal-to-noise ratio by noise from vacant receivers.

Still referring to FIG. 12, an alternative satellite transponder configuration which is less spectrum-efficient, would utilize more than one up converter/transmitter pair, correspondingly increase the number of selective combiners, and partition the N receivers among the combiners. (In the limit, each receiver 70-1 through 70-N would have its own up converter and transmitter.) The transmitters would operate at different frequencies, enabling multiple links for relaying reply signals to the ground station. This alternative configuration can increase the average reply signal throughput, at the expense of system spectrum utilization.

Ground Station Equipment

The ground station GS of the present invention includes a number of different subsystems for carrying out the following functions: (1) generation and transmission of the interrogation signals (IPGs), (2) reply signal reception, decoding, and arrival time measurement, (3) computation of transceiver position based on reply signal arrival times and information obtained from a stored topographical ground contour map, (4) encoding and transmission of position messages for returning information to specific user transceivers, (5) encoding and transmission of other optional messages addressed to specific user transceivers, and (6) reception, decoding, and routing of other optional messages from specific user transceivers. Each of these functions will be described in turn with reference to FIGS. 13, 14 and 15.

Figure 13:
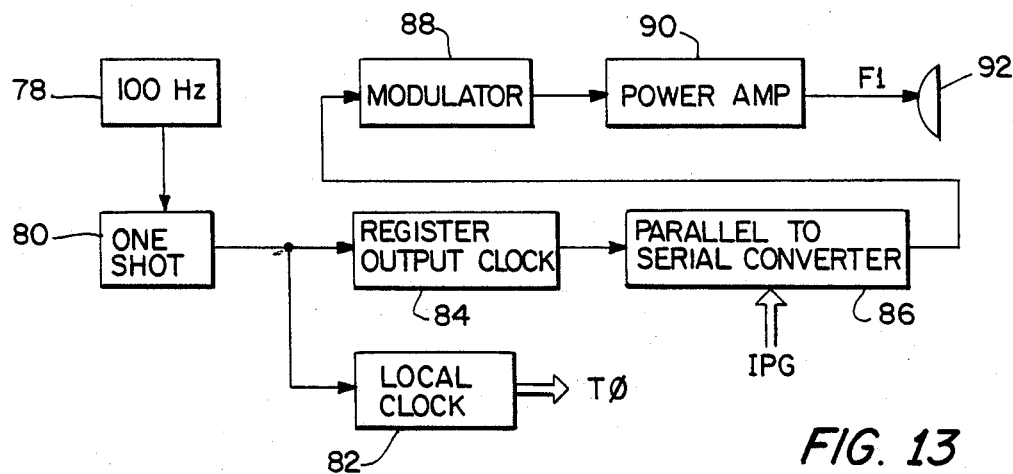
FIG. 13 illustrates exemplary circuitry for the generation of interrogation signals at the ground station.

FIG. 13 illustrates exemplary circuitry for generating and transmitting the interrogation pulse group (IPG) at the ground station. The interrogation rate is established by a 100 Hz oscillator 78 which is coupled by means of a one-shot multivibrator 80 to a register output clock 84 and a local clock 82. The register output clock 84 will shift the IPG, including any messages contained therein, from a parallel-to-serial converter 86 to a modulator 88 and power amplifier 90. The modulated RF signal is radiated from the ground station by means of an antenna 92. The one-shot 80 causes a local clock 82 to produce a digital output T0, representing the transmission time of the interrogation signal from the ground station.

Figure 14:
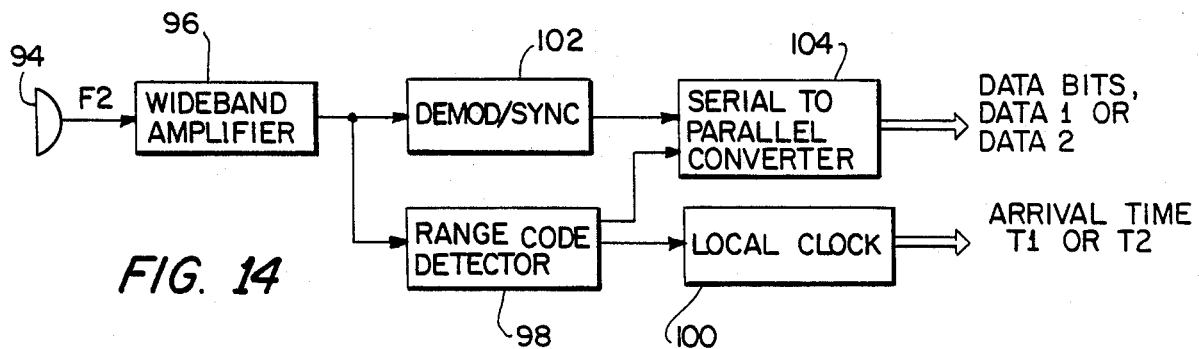
FIG. 14 illustrates exemplary circuitry for receiving and decoding the transceiver reply signals at the ground station, and for measuring the arrival time of these signals.

FIG. 14 depicts exemplary circuitry which may be employed at the ground station for receiving the user reply signals from the satellites S1 and S2. It should be understood that two such circuits will be required, one corresponding to each of the two receiving antennas shown at the ground station GS in FIG. 2. One such antenna is indicated at 94 in FIG. 14. The antenna output is connected to a wideband amplifier 96, and the amplified signal is applied to a demodulator and bit synchronization unit 102 in order to obtain the user identification and optional message information from the reply signal. The serial output of the demodulator 102 is applied to a serial-to-parallel converter 104, which converts the detected data bits to a parallel format. The legend DATA 1 in FIG. 14 refers to the data bits received through satellite S1, and similarly, the legend DATA 2 refers to the data bits received through satellite S2. Of course, the circuit of FIG. 14 will produce only one of the two outputs DATA 1 or DATA 2, depending upon which of the two satellites S1, S2 the antenna 94 is aligned with.

Still referring to FIG. 14, a tap from the output of the wideband amplifier 96 is connected to a range code detector 98. The range code detector produces an output when the predetermined range code is found to exist in the received reply signal. The detector output is used to enable the serial-to-parallel converter 104, and also triggers a digital output from a local clock 100. The clock output represents the arrival time of the reply signal at the ground station, and is represented as T1 in the case of reply signals relayed by satellite S2. As with the data outputs, it should be understood that only one of the two outputs T1 or T2 will be produced by the circuit of FIG. 14, depending upon the particular satellite at which the antenna 94 is pointed.

In the event that CDMA techniques are utilized for the user reply signals, as suggested earlier, it should be understood that certain components of the circuit shown in FIG. 14 must be duplicated in accordance with the number of different PN codes which are employed. These modifications will be apparent to those skilled in the art and need not be described in detail.

Figure 15:
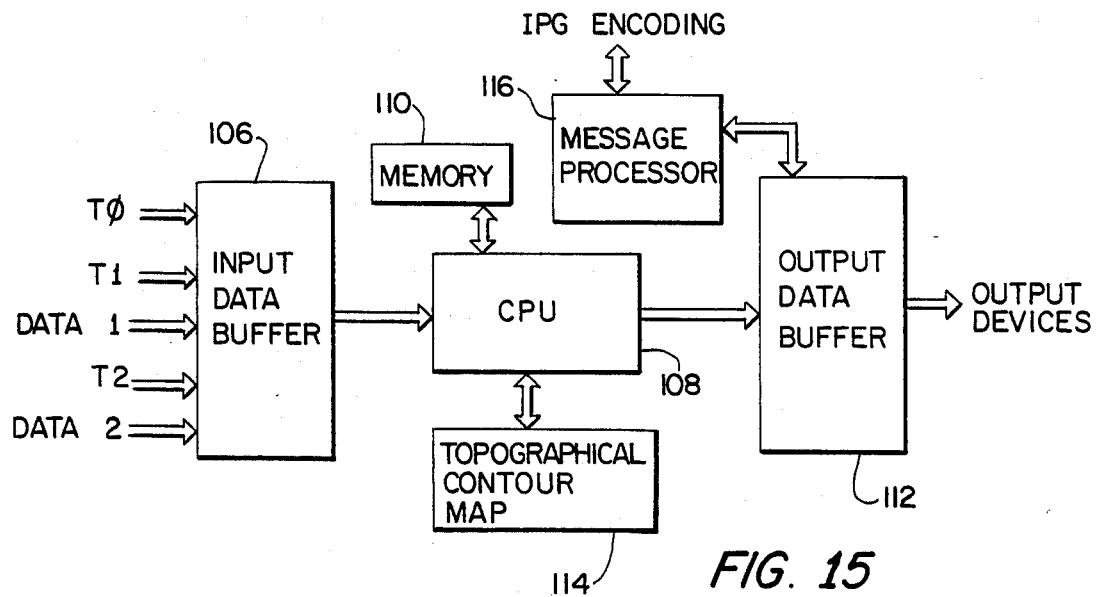
FIG. 15 illustrates an exemplary configuration for the ground station computer that is used to process the output information provided by the circuitry of FIGS. 13 and 14, to interface with the stored topographical contour map for position computations, and to interface with external message handling systems.

FIG. 15 illustrates an exemplary configuration for the ground station computer that is used to process the time measurements and other information developed by the circuitry shown in FIGS. 13 and 14, and to generate position information for the various user transceivers being served by the system. The illustrated configuration also provides for the handling of all messages between the ground station GS and the user transceivers, and includes the routing of other information between different user transceivers or between user transceivers and elements external to the system.

The primary components of the ground station computer include an input data buffer 106, a central processing unit 108, a memory unit 110, an output data buffer 112, a topographical contour map (terrain map) storage unit 114, and a message handling processor 116.

The terrain map memory unit 114 for the present invention should be high speed to support position computation on demand for a large number of users, and the capacity must be large to accommodate sufficient numbers of elevation points in the geographical array. The types, capacities, access speeds, and cost of available memory devices continues to improve at a rapid rate. Memory units of $10^{10}$ bytes with access times of 15 milliseconds have been available for several years. The exact nature of the map memory is subject to various trade-offs among the quantization of elevation values, the separation of terrain samples, the total area serviced, the number of users serviced, and the manner of storing data. Regarding the last-mentioned factor, it will be appreciated that areas of slowly varying terrain height do not require as high a grid density as areas of mountainous terrain.

For the purposes of the present invention, the input data buffer 106 receives the following input information, all of which is provided by the circuitry of FIGS. 13 and 14: the interrogation signal (IPG) transmission time T0, the arrival time T1 of the reply signal from satellite S1, the data bits DATA 1 (i.e., identification code, message, and message address) corresponding to the S1 reply signal, the arrival time T2 of the reply signal from satellite S2, and the data bits DATA 2 corresponding to the S2 reply signal. Appropriate strobe signals (not shown) may be applied to the input data buffer 106 to cause these inputs to be loaded into the buffer when they appear at the circuit outputs in FIGS. 13 and 14.

Figure 16:
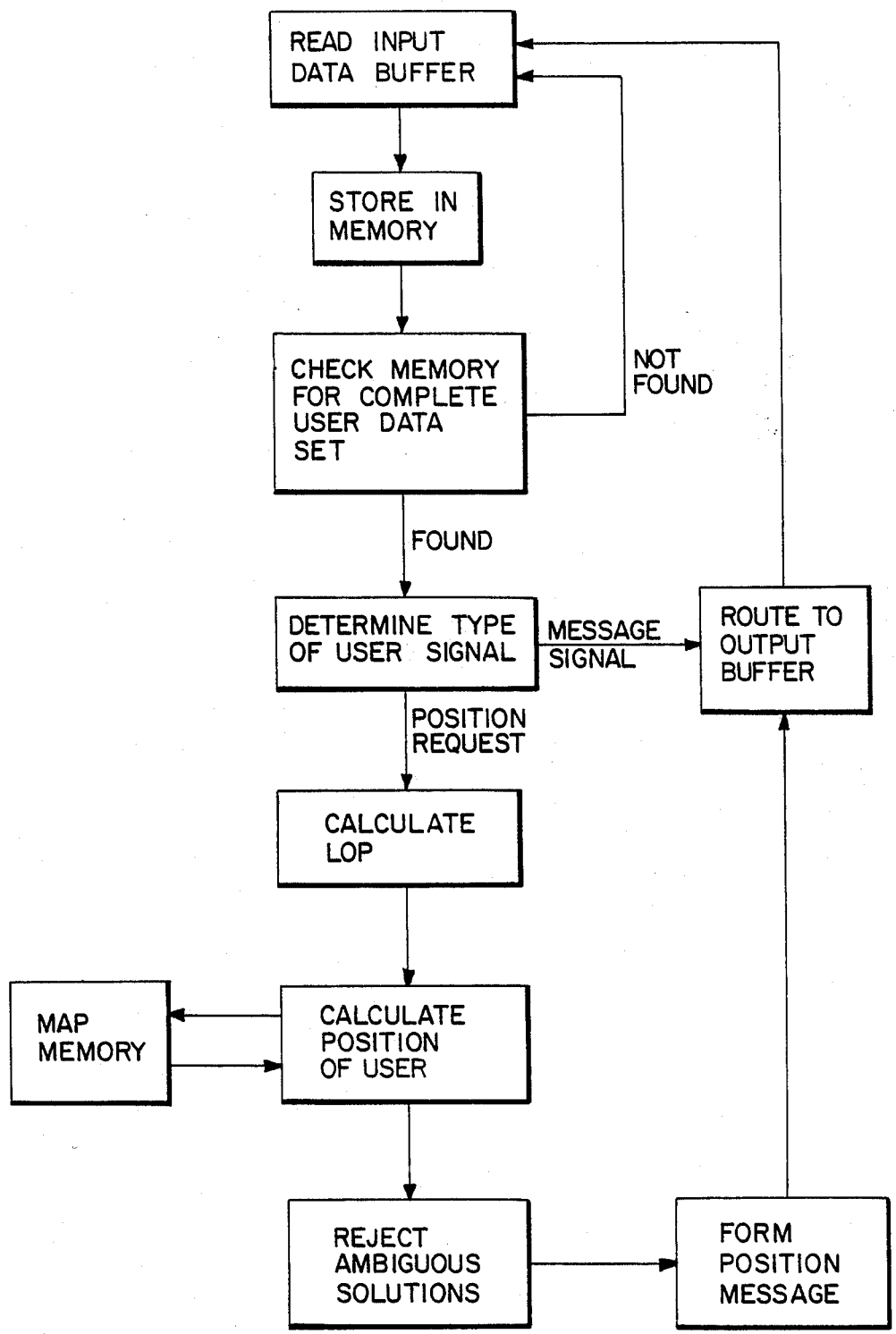
FIG. 16 provides a flowchart which illustrates generally the sequence of operations that is carried out by the ground station computer of FIG. 15.

The operation of the ground station computer is illustrated in the flow chart of FIG. 16. It is apparent that the signal data bits and time measurements derived from each of the two satellite links will not, in general, appear at the input buffer at the same time. Therefore, the CPU 108 will simply load the present reply signal data bits and store the time measurements and signal data bits in the memory unit 110. As soon as two successive return signals (from the two satellites S1 and S2) identifying the same user transceiver have been received, the CPU 108 ascertains the type of signal (e.g., position request or message transfer request, as exemplified in FIGS. 8 and 9). For position requests, the CPU 108 can calculate the position of the identified transceiver in terms of latitude and longitude using the two arrival time measurements and the contents of the terrain map storage 114, together with certain stored constants or externally provided parameters. The latter will include the position of the two satellites S1 and S2, calibration values of circuit delay for various components of the system, and certain constraining information for position ambiguity resolution. The calculated position, together with any decoded messages from the user transceiver, is transferred to the output data buffer 112 which serves the desired output devices at the ground station (e.g., display monitors). The output buffer 112 also provides inputs to the message processor 116 for encoding IPGs with position and message information intended for specific user transceivers. Following completion of the processing of the position or message transfer request, the processor again checks the input buffer for new reply signal bits and the cycle of operation is repeated.

Precision Approach for Aircraft

Figure 17:
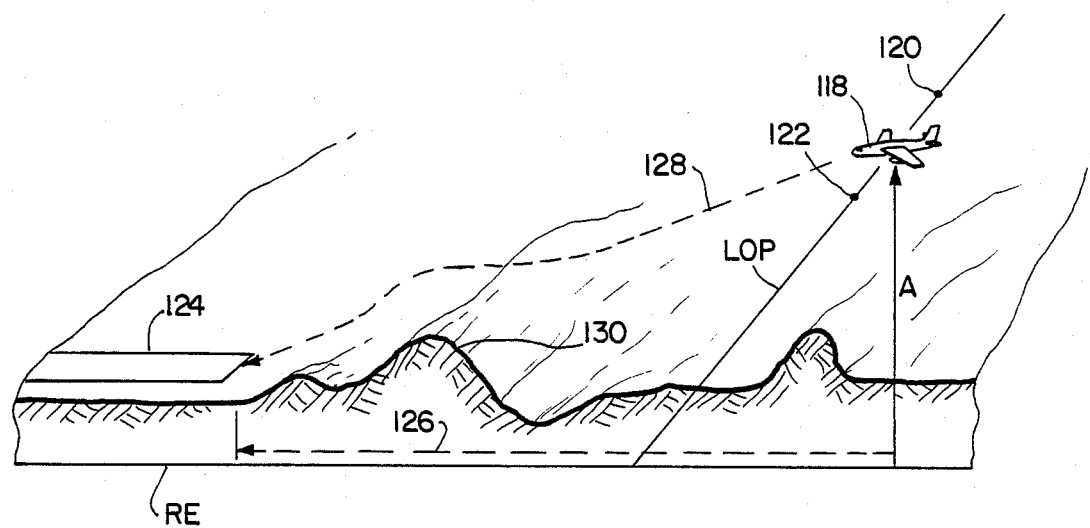
FIG. 17 illustrates the manner in which the present invention can be used to provide an aeronautical precision approach capability.

Although the present invention is of primary utility in connection with surface users, non-surface users can also be serviced. In FIG. 17, for example, a method for providing precision approach guidance to landing aircraft 118 is illustrated. If it is assumed that the aircraft 118 is equipped with a transceiver of the type previously described, a line of position LOP for the aircraft can be calculated based on the arrival times of the reply signals from the two satellites S1 and S2. In this case, however, the location of the aircraft along the LOP is determined not from the stored terrain map, but instead from the altitude A of the aircraft as reported by its altimeter. The aircraft altitude may, for example, be included in the aircraft reply to the interrogation signal. With that information, the position of the aircraft 118 along the LOP can be determined with an accuracy corresponding approximately to that of the aircraft altimeter. Graphically, the aircraft is located on a segment of the LOP bounded by the two points 120 and 122, these points corresponding to the extremes of altimeter error. From the calculated position of the aircraft 118, and the known location of the airport runway 124, a ground track 126 can be derived for the aircraft along the reference ellipsoid RE. The height of the local terrain 130 at all points along the ground track 126 can be determined from the stored terrain map at the ground station GS. Based on the calculated ground track and the terrain height information, an approach path 128 for the aircraft 118 can be computed at the ground station and relayed to the aircraft 118 in the form of up/down and left/right direction steers.

It is also possible to provide useful approach guidance for the aircraft 118 without relying on altimeter information originating from the aircraft. This method is particularly applicable to aircraft with minimal-cost transceivers. In that case, the ground station computer calculates the aircraft position along the LOP based on the assumption that the aircraft is at the correct altitude on the glide slope (i.e., the aircraft position is taken as the intersection point between the LOP and the glide slope). The ground station sends messages to the aircraft 118 providing both left/right position steers and information on the altitude at which the aircraft should be flying in order to be on the glide slope. If the pilot holds to these altitudes by comparing the altitude messages to his visual onboard altimeter, the deviation from the glide slope will be small.

Optional Terrain Map Generation

Figure 18:
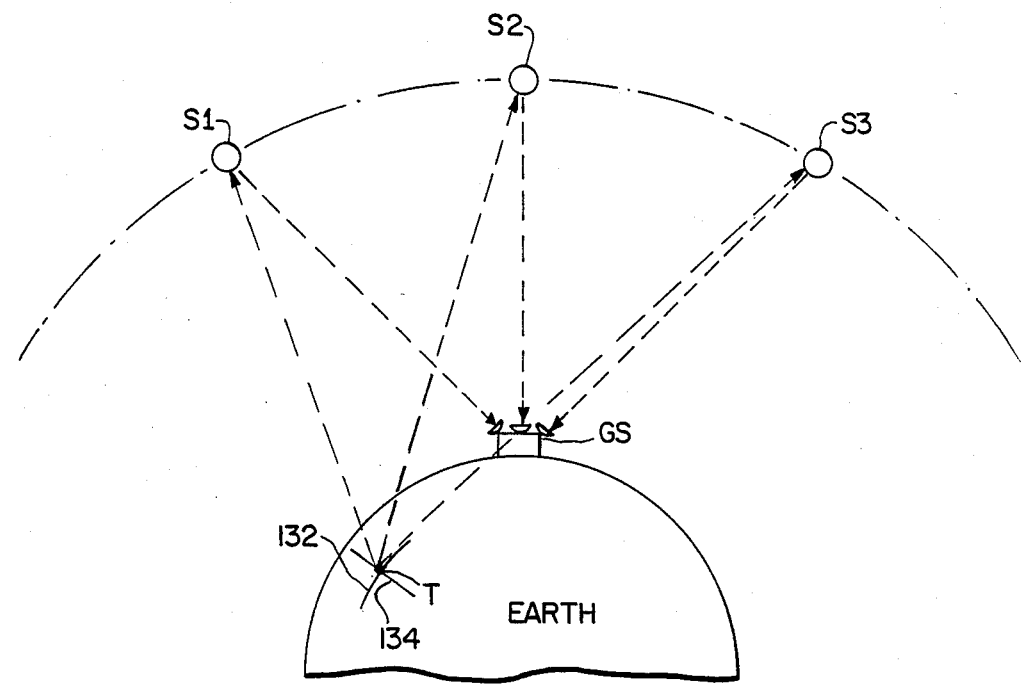
FIG. 18 illustrates alternative methods for generating the terrain height information stored in the ground station computer.

As previously mentioned, the contents of the terrain map storage unit 114 of FIG. 15 may consist of previously compiled information which is already available from governmental sources. However, it is also possible to utilize a satellite positioning system to obtain the terrain height information. FIG. 18 illustrates a number of methods by which this may be accomplished.

If it is assumed that a transceiver T at a known latitude (line 132) and longitude (line 134) is interrogated by the ground station GS, it is apparent that the return signal from a single geostationary satellite (e.g., satellite S1) will allow the ground station to derive a height coordinate for the transceiver. Hence by locating the transceiver T at a large number of known surface locations, the terrain height at those locations can be calculated and stored. This assumes, of course, that the two horizontal coordinates of the transceiver can be initially determined by other methods.

If only one horizontal coordinate of the transceiver T is known, the reply signal can be relayed through two geostationary satellites (e.g., satellites S1 and S2) to allow the ground station GS to calculate the other horizontal coordinate and the terrain height. If three geostationary satellites S1, S2 and S3 are employed, the transceiver T can be moved randomly about the earth's surface without prior knowledge of its latitude or longitude. In this embodiment, the reply signals relayed through the three satellites allow the ground station GS to determine latitude, longitude and terrain height simultaneously. Reference may be had to the aforementioned U.S. Pat. No. 4,359,733 for the use of three satellites to obtain a three-dimensional position fix.

For a system containing only two geostationary satellites, a precision three-dimensional terrain map may be constructed by moving around the earth's surface a transceiver equipped with a precision barometric altimeter, whose data are encoded and fed back to the ground station with each reply. This method does not require prior knowledge of the transceiver position. It is particularly accurate if used in combination with a similar transceiver/altimeter located at a surveyed benchmark of known height above the reference ellipsoid RE, near enough to the movable transceiver so that the two altimeters are in an air mass with the same or similar barometric pressure. Distances of several miles between the transceivers are practical before the errors in this method become large.

Although the present invention has been described with reference to a preferred embodiment, it should be understood that the invention is not limited to the details thereof. Various modifications and substitutions may be made in the illustrated embodiment without departing from the spirit and scope of the invention as defined in the appended claims.

What is claimed is:

1. A method for generating terrain map information representing local terrain elevations at a plurality of points on the earth's surface, comprising:
    placing a transceiver at a position of known latitude and longitude on the earth's surface, said transceiver being operable to transmit a reply signal in response to a received interrogation signal;
    transmitting an interrogation signal to said transceiver;
    receiving a reply signal from said transceiver through a relay satellite at a known orbital location above the earth;
    calculating the terrain elevation at the transceiver location based on the transmission time of the interrogation signal and the arrival time of the reply signal from the satellite;
    entering said terrain elevation into a terrain map memory as a function of said latitude and longitude; and
    moving the transceiver to a different position and repeating the foregoing method steps.

2. A method for generating terrain map information representing local terrain elevations at a plurality of points on the earth's surface, comprising:
    placing a transceiver at a position of known latitude or longitude on the earth's surface, said transceiver being operable to transmit a reply signal in response to a received interrogation signal;
    transmitting an interrogation signal to said transceiver;
    receiving a reply signal from said transceiver through two relay satellites at spaced orbital locations above the earth;
    calculating the terrain elevation and the unknown latitude or longitude of the transceiver based on the transmission time of the interrogation signal and the arrival times of the reply signal from the two satellites;
    entering said terrain elevation into a terrain map memory as a function of said latitude and longitude; and
    moving the transceiver to a different position and repeating the foregoing method steps.

3. A method for generating terrain map information representing local terrain elevations at a plurality of points on the earth's surface, comprising:
    placing a transceiver at a random position on the earth's surface, said transceiver being operable to transmit a reply signal in response to a received interrogation signal;

transmitting an interrogation signal to said transceiver;

receiving a reply signal from said transceiver through three relay satellites at spaced orbital locations above the earth;

calculating the latitude, longitude and terrain elevation of the transceiver location based on the transmission time of the interrogation signal and the arrival times of the reply signal from the three satellites;

entering said terrain elevation into a terrain map memory as a function of said latitude and longitude; and moving the transceiver to a different position and repeating the foregoing method steps.

4. A method for generating terrain map information representing local terrain elevations at a plurality of points on the earth's surface, comprising:

placing a transceiver at a random position on the earth's surface, said transceiver being operable to transmit a reply signal in response to a received interrogation signal, said reply signal including altitude information obtained from an altitude-sensing device associated with said transceiver;

transmitting an interrogation signal to said transceiver;

receiving a reply signal from said transceiver through two relay satellites at spaced orbital locations above the earth;

calculating the latitude, longitude and terrain elevation of the transceiver based on the transmission time of the interrogation signal, the arrival times of the reply signal from the two satellites, and the altitude information included in the reply signal;

entering said terrain elevation into a terrain map memory as a function of said latitude and longitude; and moving the transceiver to a different position and repeating the foregoing method steps.

5. A method for providing approach guidance to a landing aircraft using two relay satellites at spaced orbital locations above the earth, said aircraft carrying a transceiver for transmitting a reply signal in response to a received interrogation signal, said method comprising the steps of:

transmitting an interrogation signal to the aircraft transceiver at a known or measured time;

receiving a reply signal from the aircraft transceiver through each of the two satellites;

calculating a line of position for the aircraft based on the arrival times of the reply signal through the two satellites and the transmission time of the interrogation signal;

determining the approximate location of the aircraft on the line of position from altitude information provided by the aircraft altimeter;

calculating a ground track between the aircraft location and an airport runway;

determining the terrain height along the ground track by reference to a stored terrain map providing local terrain elevations at a plurality of points on the earth's surface;

calculating an approach path for the aircraft based on the ground track and the terrain height information obtained from the stored terrain map; and providing the aircraft with direction steers to assist the aircraft in following said approach path.

6. A system for determining the position of a user located on the earth's surface, comprising:

a user-carried transceiver for receiving an interrogation signal and transmitting a reply signal in response to said interrogation signal;

two satellites at spaced orbital locations above the earth, each of said satellites carrying repeater means for receiving and retransmitting the reply signal transmitted by the user-carried transceiver; and a ground station for periodically transmitting the interrogation signal and for receiving and processing the retransmitted reply signals from the two satellites, said ground station including means for calculating the user position based on the arrival times of the retransmitted reply signals at the ground station, the transmission time of the interrogation signal from the ground station, and the elevation of the user on the earth's surface, said elevation being derived from a stored terrain map providing local terrain elevations at a plurality of points on the earth's surface;

wherein said terrain map provides terrain heights at second points spaced from input reference points on a reference ellipsoid approximating the earth's surface, said second points having horizontal positions corresponding to the intersection points between the surface of the earth and the possible lines of position established by the two satellites.

7. A method for determining the positions of a user located on the earth's surface using two relay satellites at spaced orbital locations above the earth, said user carrying a transceiver for transmitting a reply signal in response to a received interrogation signal, said method comprising the steps of:

transmitting an interrogation signal to the user at a known or measured time;

receiving a reply signal from the user through each of the two satellites;

measuring the arrival times of the reply signals received through the two satellites;

calculating a line of position for the user based on the arrival times of the reply signal through the two satellites and the transmission time of the interrogation signal; and determining the intersection of the line of position with the earth's surface by reference to a stored terrain map providing local terrain elevations at a plurality of points on the earth's surface;

wherein the two satellites are in geostationary orbit about the earth, each of said satellites being located in a different position in said orbit, and wherein the step of determining the intersection of the line of position with the earth's surface comprises the following steps:

determining the intersection of the line of position with a reference ellipsoid approximating the earth's surface to define a reference point on said ellipsoid;

obtaining from the stored terrain map the terrain height at the reference point;

calculating the approximate intersection of the line of position with the earth's surface from the terrain height at the reference point and the known angle of the line of position with respect to the reference ellipsoid.

8. A method for determining the position of a user located on the earth's surface using two relay satellites at spaced orbital locations above the earth, said user carrying a transceiver for transmitting a reply signal in response to a received interrogation signal, said method comprising the steps of:

transmitting an interrogation signal to the user at a known or measured time;

receiving a reply signal from the user through each of the two satellites;

measuring the arrival times of the reply signals received through the two satellites;

calculating a line of position for the user based on the arrival times of the reply signal through the two satellites and the transmission time of the interrogation signal; and determining the intersection of the line of position with the earth's surface by reference to a stored terrain map providing local terrain elevations at a plurality of points on the earth's surface;

wherein the two satellites are in geostationary orbit about the earth, each of said satellites being located in a different position in said orbit, and wherein the step of determining the intersection of the line of position with the earth's surface comprises the following steps:

determining the intersection of the line of position with a reference ellipsoid approximating the earth's surface to define a reference point on said ellipsoid; and using the reference point as an input, obtaining from the stored terrain map the terrain height at a second point on the reference ellipsoid which is spaced from said reference point, said second point having the same horizontal position as the intersection of the line of position with the earth's surface.

* * * * *